(12) United States Patent
Bais et al.

(10) Patent No.: US 7,720,023 B2
(45) Date of Patent: *May 18, 2010

(54) TELECOMMUNICATION SYSTEM AND METHOD FOR TRANSMITTING VIDEO DATA BETWEEN A MOBILE TERMINAL AND INTERNET

(75) Inventors: Michel Alexander Bais, Enkhuizen (NL); Rudi Schramp, The Hague (NL); Franklin Selgert, Berkel en Rodenrijs (NL); Frederik Harm Klok, Delfgauw (NL)

(73) Assignee: Nokia Corporation, Espoo (FI)

( * ) Notice: Subject to any disclaimer, the term of this patent is extended or adjusted under 35 U.S.C. 154(b) by 1334 days.

This patent is subject to a terminal disclaimer.

(21) Appl. No.: 10/430,560

(22) Filed: May 6, 2003

(65) Prior Publication Data

US 2003/0210682 A1 Nov. 13, 2003

(30) Foreign Application Priority Data

| | | | |
|---|---|---|---|
| May 7, 2002 | (EP) | | 02076821 |
| Dec. 10, 2002 | (EP) | | 02080168 |

(51) Int. Cl.
*H04Q 7/00* (2006.01)
*H04L 12/66* (2006.01)
*H04L 12/28* (2006.01)

(52) U.S. Cl. ............... 370/328; 370/352; 370/401
(58) Field of Classification Search ............... 370/401, 370/229, 230, 351, 352–356
See application file for complete search history.

(56) References Cited

U.S. PATENT DOCUMENTS

| | | | |
|---|---|---|---|
| 5,961,589 A | 10/1999 | Hansen | |
| 6,487,602 B1 * | 11/2002 | Thakker | 709/230 |
| 6,799,223 B1 * | 9/2004 | Yamamoto | 709/250 |
| 6,937,572 B1 * | 8/2005 | Egan et al. | 370/252 |
| 7,061,894 B2 * | 6/2006 | Pang et al. | 370/338 |
| 2001/0034228 A1 * | 10/2001 | Lehtovirta et al. | 455/424 |
| 2001/0048685 A1 * | 12/2001 | Park et al. | 370/401 |
| 2002/0024943 A1 | 2/2002 | Karaul | |
| 2002/0024945 A1 | 2/2002 | Civanlar et al. | |

(Continued)

FOREIGN PATENT DOCUMENTS

JP 2000-138902 5/2000

(Continued)

*Primary Examiner*—Kevin C Harper
*Assistant Examiner*—Christine Duong
(74) *Attorney, Agent, or Firm*—McDonnell Boehnen Hulbert & Berghoff, LLP

(57) ABSTRACT

This invention relates to a system and a method for a telecommunication system, comprising a circuit switched network connected with mobile terminals, moreover comprising, for the transmission of streaming video content from a streaming video server within the internet to the mobile terminals, a gateway, connected to the circuit switched network at the one side and connected to the internet at the other side, the gateway being fit for the conversion of files having an internet compatible streaming video format received from the streaming video server, into streaming video bitstreams in a format fit to be transmitted to the mobile terminals via the circuit switched network, wherein the telecommunication system further comprises a registration unit, connectable with the mobile terminals via a packet switched network and fit for registering, for each relevant mobile terminal, a terminal identifier linked to the mobile terminal's node address at the circuit switched network.

10 Claims, 2 Drawing Sheets

U.S. PATENT DOCUMENTS

| | | | |
|---|---|---|---|
| 2002/0035699 A1* | 3/2002 | Crosbie | 713/201 |
| 2002/0093531 A1 | 7/2002 | Barile | |
| 2003/0028643 A1* | 2/2003 | Jabri | 709/226 |
| 2003/0091026 A1* | 5/2003 | Penfield et al. | 370/352 |

FOREIGN PATENT DOCUMENTS

| | | |
|---|---|---|
| JP | 2001-168923 | 6/2001 |
| JP | 2002-084524 | 3/2002 |
| WO | WO 00/25486 | 5/2000 |

* cited by examiner

TELECOMMUNICATION SYSTEM AND METHOD FOR TRANSMITTING VIDEO DATA BETWEEN A MOBILE TERMINAL AND INTERNET

FIELD OF THE INVENTION

The invention refers to a system and a method for transmitting streaming video content from a streaming video server within the internet to mobile terminals. The invention refers also to a gateway to be used for the transmission of streaming video content to mobile terminals.

BACKGROUND OF THE INVENTION

Due to a slow standardization process, the first UMTS terminals will not contain a standardized solution for packet switched video and audio streaming. At this moment known vendors offer proprietary platforms for both UMTS and GPRS streaming services. Investing in these proprietary platforms cause customer lock in because upgrading towards standards is needed in the future.

SUMMARY OF THE INVENTION

The invention presents a telecommunication system comprising, for the transmission of streaming video content from a streaming video server within the internet to mobile terminals, a gateway, connected to the circuit switched network at the one side and connected to the internet at the other side, said gateway being fit for the conversion of files having an internet compatible streaming video format received from said internet streaming video server, into streaming video bitstreams in a format fit to be transmitted to the mobile terminals via the circuit switched network.

As nowadays there are no standard protocols to have such a conversion gateway communicate with mobile terminals, as a preferred option use may be made of a standardized protocol for videoconferencing between mobile terminals. It is noted that such a videoconferencing protocol is meant and developed to be used in architectures wherein two or more users, having videoconferencing enabled mobile phones, may videoconferencing with each other.

To be able to use such a videoconferencing protocol for downloading streaming video content from an internet server or client to mobile terminals, the mobile terminals and the gateway at the side of the circuit switched network preferably are fit for exchanging video bitstreams complying the relevant protocol for phone-to-phone videoconferencing. The ITU H.324M videoconferencing protocol may be very fit for the intended purpose.

One aspect of the invention is to use a protocol, standardized for phone-to-phone videoconferencing, for the enabling of downloading streaming video content originated by internet content services to mobile terminals, which lies within a quite different technical field.

To be able to manage the mobile terminal addresses to which the streaming files have to be targeted via the circuit switched network after conversion in the gateway, the system preferably comprises registration means, connectable with said mobile terminals, e.g. via said packet switched network, and fit for registering, for each relevant mobile terminal, a (preferably unique) terminal identifier which is linked to the mobile terminal's node address in the circuit switched network.

On requesting certain content from the content service, the terminal may send, attached to that request, its terminal identifier, which may be used to direct the requested content to be downloaded—via the circuit switched network—to the right circuit switched network address (connecting node) of the requesting mobile terminal. To that end, the system may comprise means for retrieving, at the registration means, the circuit switched network node address of the right (viz. the relevant content requesting) destination terminal, guided by the terminal identifier of the mobile terminal requesting for the streaming video content at the streaming video server, and means for transmitting said streaming video content, converted into streaming video bitstreams by said gateway, to the retrieved circuit switched network node address.

There are two options for setting up—after retrieval of the right terminal address and before the transmission of the streaming content to the right terminal address—a connection through the circuit switched network between the gateway and the right destination terminal viz.

- the gateway may originate a call to the terminal of which the node address was retrieved in the registration means, or (in opposite direction)
- the terminal may originate a call to the gateway and the gateway investigates whether the originating terminal is the right one by matching the calling terminal's CLI (equal to its node address) with the node address which was retrieved in the registration means.

DETAILED DESCRIPTION OF THE DRAWINGS

Figure 1:
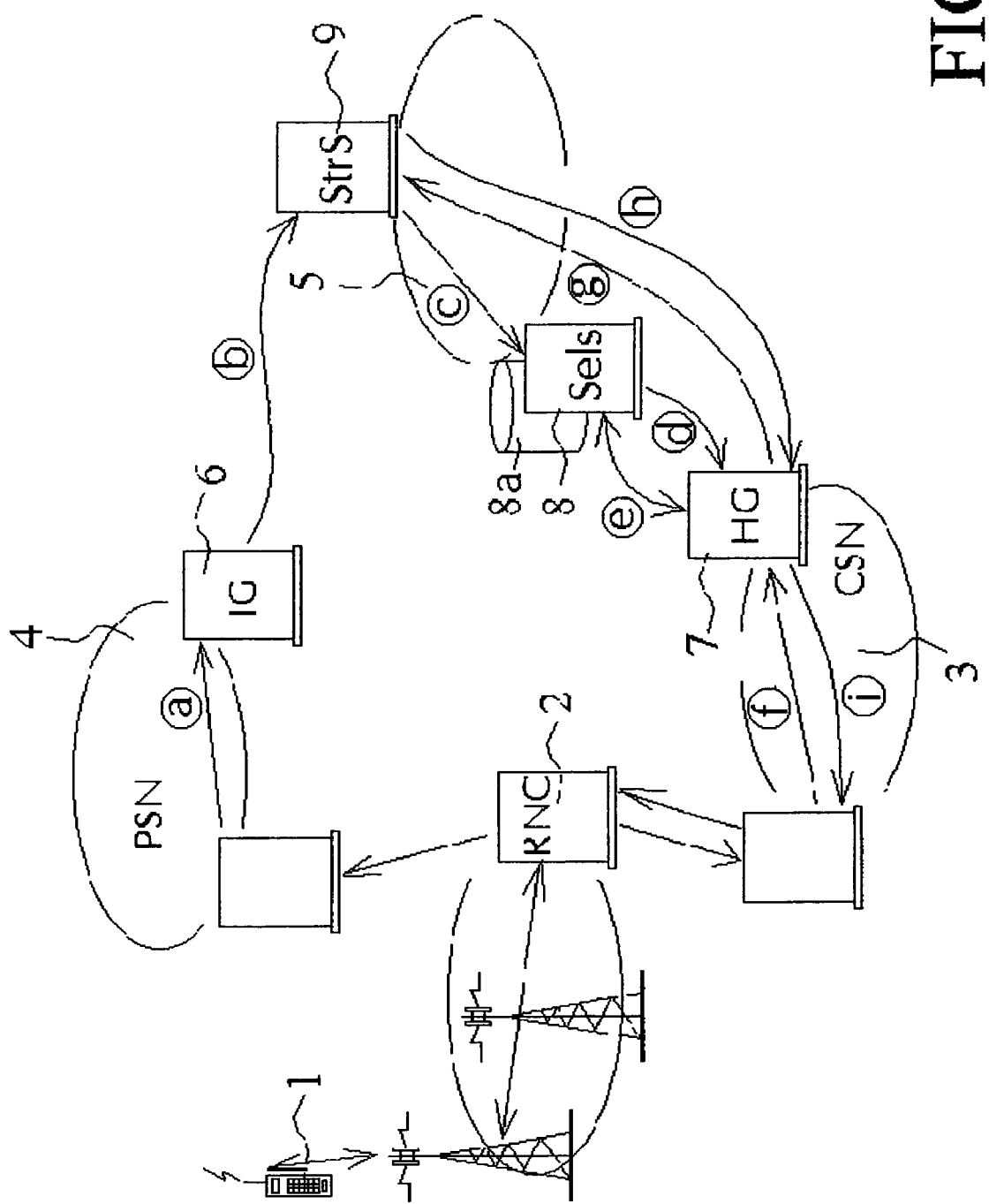
FIG. 1 depicts a preferred system architecture.

In FIG. 1 terminals 1 are connectable, via base stations and a "Radio network Controller" (RNC) 2, with a circuit switched network (CSN) 3 and a packet switched network (PSN) 4. Via the packet switched network 4 the terminals 1 can browse the internet 5, viz. via an internet gateway (IG) 6. For the transmission of streaming video content from a streaming video server 9 within the internet 5 to the mobile terminals 1, a gateway 7 is connected to the circuit switched network 3 at the one side and the internet 5 at the other side. The gateway 7 is fit for the conversion of files having an internet compatible streaming video format, received from said streaming video server 9, into streaming video bitstreams in a format fit to be transmitted via the circuit switched network to the mobile terminals.

The mobile terminals 1 and the gateway 7 (at said one side) are fit for exchanging video bitstreams complying with a protocol which was, up to now, only applied for phone-to-phone videoconferencing, but which is applied now for gateway-to-phone communication. This videoconferencing related protocol preferably is the ITU H.324M protocol.

To be able to route the streaming files in the circuit switched network to the right terminal or node address after their conversion in the gateway, the system comprises registration means which are connectable with said mobile terminals 1 via said packet switched network 4 and which are fit for registering, for each relevant mobile terminal, a terminal identifier linked to the mobile terminal's node address at the circuit switched network. In FIG. 1 the registration means may be formed by an internet selection server 8. The selection server 8 comprises a database 8a, in which—via an initial user/terminal registration process for each user or terminal—unique terminal identifiers are stored which are linked to the relevant calling number or "calling line identifiers" (CLIs) of the terminals, valid for calling them via the circuit switched network. In most cases, during said initial registration process, the terminal user has to input that calling number via the terminal's keypad. The unique terminal identifier may be generated automatically by the terminal itself, e.g. by the terminal's SIM card, or by the gateway 6. After the registration process, only the unique (non-CLI) terminal identifier needs to be used within the internet, viz. by the streaming video server 9.

After having selected, at the streaming server 9, some video content, this content has to be routed to the right (requesting) terminal, viz. the terminal which is linked to the relevant unique terminal identifier, received by the content server 9.

The selection server 8 comprises means for retrieving, in the database 8a, the right circuit switched network node address (CLI) under control of the terminal identifier sent to the content
server 9 while requesting for the streaming video content.

Server 9 will process the requested content by downloading it to the gateway 7 between the internet and the circuit switched network 3, labeling the downloaded content with the CLI of the requesting terminal 1. The CLI has previously been retrieved at the selection server 8.

While or after downloading the content to the gateway 7, a connection has to be set up via the circuit switched network 3, between the gateway 7 and the right destination terminal 1. There are two options for setting up such a connection.

In a first option the gateway 7 originates a call through the circuit switched network to the terminal 1 of which the node address (CLI) was retrieved in the selection server 8 (read from the "CLI label" of the content stream) and, subsequently, transmits the converted content to that terminal.

In a second option the terminal 1 originates a call to the gateway 7 and the gateway 7 investigates whether the originating terminal 1 is the right destination terminal, viz. by matching the originating terminal's CLI, detected via the circuit switched network, with the CLI as was retrieved in the selection server 8 (detected from the "CLI label" of the video stream). If both CLIs match, the gateway 7 will download/stream the content to the calling terminal 1.

Finally, the process will be outlined step-by-step:

Step a: Browsing on the internet via mobile terminal 1 with H.324M capabilities and the internet gateway 6 of a service provider or operator.

Step b: Selection of a video URL for H.324M phones 1 on third party Streaming Server 9. This may be a free video server requiring no payment by the user.

Step c: The link points to the Selection Server 8 of a video portal containing the video selected and possible any kind of registration key Step d: The selection server 8 notifies the H.324M gateway 7 to set up a call guided by the unique ID stored—via the initial subscription process—in the ID-CLI database 8a.

Step e: With the unique ID the H.324M gateway 7 retrieves the relevant CLI from the selection server 8.

Step f: The H.324M gateway 7 initiates a H.324M connection with the retrieved CLI. As an alternative, the relevant terminal may initiate the call, which is investigated by gateway 7 by means of CLI-matching.

Step g: The H.324M gateway 7 makes an internet connection with the streaming server 9 via the URL.

Step h: The streaming server 9 streams the content to the H.324M gateway 7.

Step i: The gateway 7 repackages (converts) the content stream according the H.324M protocol and sends it to the mobile terminal 1 via the circuit switched network 3.

Figure 2:
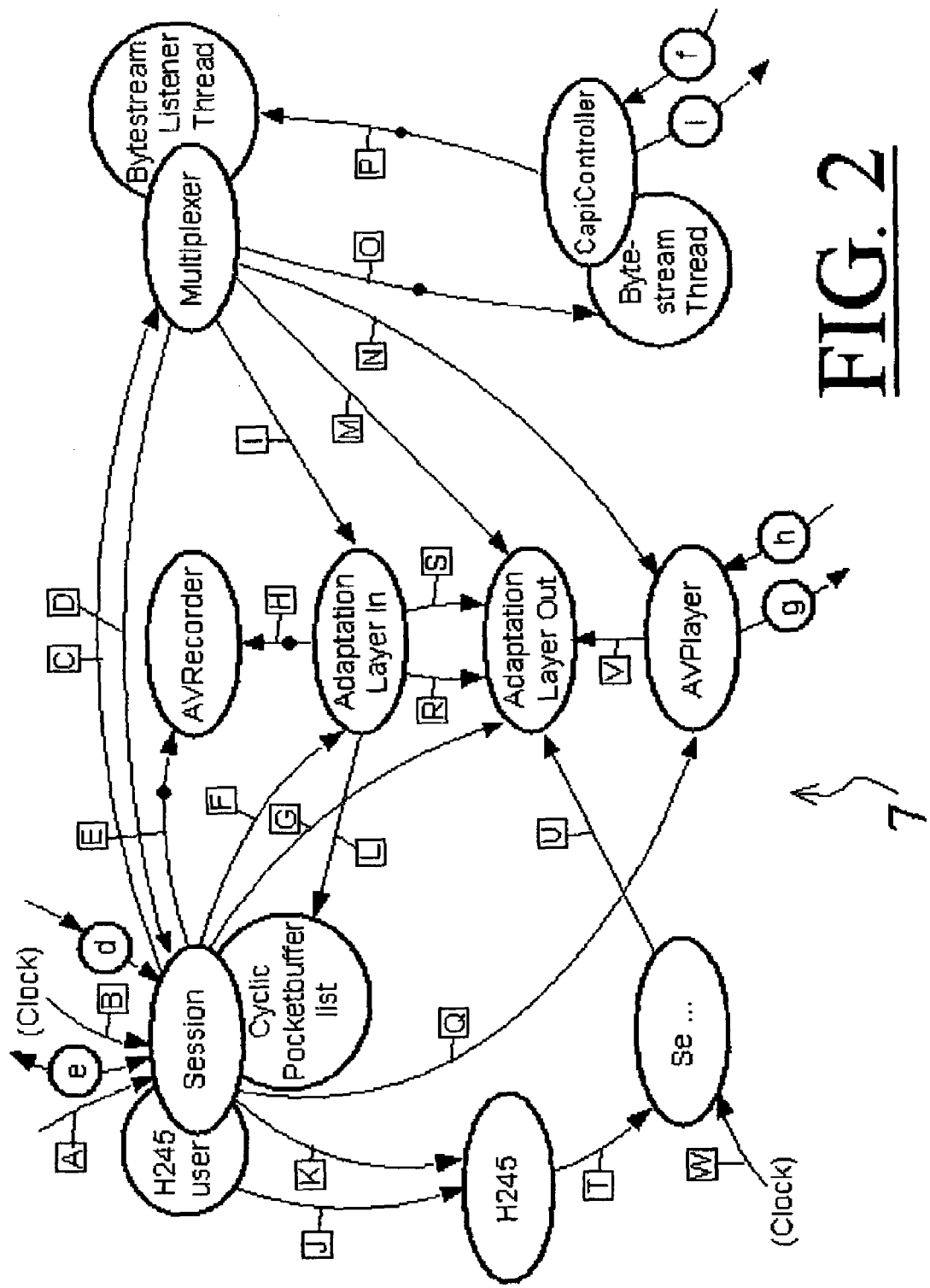
FIG. 2 shows an exemplary implementation of the H.324M Gateway.

Finally, an exemplary software implementation of the H.324M Gateway will be described and shown in FIG. 2. FIG. 2 contains following labels:

| | |
|---|---|
| A | StartThread |
| B | Initiate |
| C | Set/ClearMuxEntryIn |
|   | Set/ClearMuxEntryOut |
|   | SetMuxPriorities |
|   | HangUpCall |
| D | CallHungUp |
| E | SetWriteAudio |
|   | SetWriteVideo |
| F | SetSDU |
|   | InitCPBufferListener |
|   | Open . . . /Close . . . |
| G | Open . . . /Close . . . |
|   | SetLogicalParamOut |
|   | IsChannelOpen |
|   | EncodeAndSendLayer1SDU |
| H | WriteAudio |
|   | WriteVideo |
| I | RxDataToA1SDU |
|   | RxDataToA1PDU |
| J | DoSend |
|   | GetA1Out |
| K | DispatchASN1Message |
| L | BufferNotEmpty |
| M | GetSDU |
|   | GetLayerType |
|   | GetCurrentSDUSize |
|   | IsChannelOpen/Segmentable |
| N | TimerPlayerEvent |
| O | SendData |
| P | DataReceived |
|   | DataRequested |
|   | HungUp |
| Q | IntraStart/StopPlayer |
|   | DetermineVideoRate |
|   | SetCapabilities |
| R | (Control) |
|   | ResetSRP |
|   | PutPDU |
| S | (Video) |
|   | Retransmit |
|   | PutPDU |
| T | DoRecord |
| U | EncodeAndSendLayer1SDU |
| V | SendLayer2SDU |
|   | SendLayer3SDU |
| W | H245-timer |

H.324M Software Description

Coding Principles

Some principles that we used (on many places, though not everywhere):

one class is in one .h file plus one .cpp file, with the same filename as the class.

parameters start with an f, global variables with g, real constants with c. Local variables can start with 1. Attributes (class data members) start with an a.

class names start with an Uppercase letter. Function, parameter, and variable names start with a lowercase letter.

for booleans, we use BOOL, TRUE and FALSE. And not other spellings that would mean the same (because they have slightly different implementations).

pieces of code that need attention (because of "dirty" or "lazy" programming) are marked with two @-signs (@@).

General Structure

The "MMM.EXE" source code consists of 3 main sections, each defined as a "project" in MS Visual C++:
   H245
   H245codec
   MMM H245 and H245codec are libraries that are linked together with MMM. This is for practical reasons: the H245 message syntax (H245codec) and the message logic (H245) have been developed separately. For historical reasons, some source code refers to "Arena", an old name for the MMM application.

Global (Helper) Classes
   For general purposes we have some handy classes:
   EString—a "better" version of CString
   IniFile—a class to read and parse the MMM configuration file
   SessionLog, Log—classes to enable logging with context information, in a multi-threading program
   SafeFile—a thread-safe i/o file class
   TimerHandler, TimerObject—classes for timers (mainly H245 timers)

Threads

To encapsulate Microsoft's way of a multi-threading program, we made our own thread library. Basically a Thread is a separate piece of code that can only communicate with other Threads by using a ThreadProxy to send a Message. Each Thread has its own message queue, from which it reads messages (FIFO), while also handling timer events in between. When a Message is sent from one Thread to another, this Message can contain data as parameters. A ThreadProxy takes care of the packing and unpacking of the parameters. If the caller-Thread needs return values from the callee-Thread, the data is encapsulated in an OutputParameter. The Thread-Proxy will wait till this OutputParameter is filled, i.e. till the Message has been handled by the callee-Thread. This way we can implement a synchronous call between Threads. For different data types we need different OutputParameter classes. Currently, the following have been defined: StringArrayOutputParameter, IntegerOutputParameter, PointerOutputParameter. The program "TestThread" is an example of how threads are used.

H245codec

The H245 coded is entirely programmed in C++, i.e. there is no ASN.1 parser or anything like that involved. The entire interface of the H245 codec software is in h245asn1.h, while the implementation is in various cpp files. In this case we broke the rule that every class should have its own .cpp file and its own .h file.

The low-level packing and unpacking of bits is done in the class BitBufferManager. On top of that, the H245 syntax is regarded as a Field containing Fields. A Field is something we can encode or decode. These 2 functionalities are in one method: "endecode". The reason for this is that most implementations for encoding and decoding are identical (consisting of calls to "endecode" of the subfields).

Some basic H245 building blocks are implemented as classes:
   LengthDeterminant, Extension, SequenceExtension, ChoiceExtension, BooleanField, NumberField, ConstrainedInteger, NormallySmallInteger, OctetString, GeneralString, IA5String, OpenField With these building blocks we made constructions that often occur:
   ChoiceField, ChoiceFieldWithoutExtension, ChoiceFieldWithExtension, ChoiceIndexField, ChoiceIndexFieldWithExtension, SequenceFieldWithExtension, ArrayField.

All other H245 classes are defined by inheriting from the above classes. The main H245 message is a MultimediaSystemControlMessage. This is a ChoiceFieldWithExtension, where the choice is one of the following: RequestMessage, ResponseMessage, CommandMessage, IndicationMessage. These messages in turn are composed of sub-fields, literally following the H245 standard (and the mobile extensions that we need). Implementation of all these H245 messages has been quite some typing work. To keep the source code as small and simple as possible, some C macros were defined.

Sometimes we need to be able to copy a Field into another. *Only* for those classes where we needed them, we defined operator=( ) methods.

H245

The logic of the H245 protocol is simulated using objects H245, H245User, and Se*** (SeBlcI, SeBlcO, SeCeI, SeCeO, SeClcI, SeClcO, SeLcI, SeLcO, SeMlI, SeMlO, SeMrI, SeMrO, SeMsd, SeMtI, SeMtO, SeRmeI, SeRmeO, SeRtd). These objects send messages to each other, but these are in fact just synchronous function calls. The H245User class is an interface class: the implementation of its functions is in the "Session" class.

The Se*** classes all inherit from a generic class Se. This class has helper functions for tracing and encoding.

CAPI

CAPI is a standard library for addressing ISDN cards (http://www.capi.org). The ansi C library is intended for single threaded applications on a wide range of platforms with very detailed control on all aspects of ISDN. The CAPI classes in the H324m server are an encapsulation of the CAPI library to adapt the ansi C library to a object oriented CPP environment with multithreading support that matches the queue based multithreading architecture of the H324 Server. The library has been designed to separate ISDN/CAPI from other possible forms of transport (like TCP, Modem, Named pipes, Shared memory).

Session Communication

Two base classes are the core of a single ISDN session: ByteStream and ByteStreamListener. the ByteStream is an interface that implements the sending of data through the ISDN link. The ByteStreamListener must be implemented by the receiver of data and is used to indicate the reception of new data and to indicate the status of buffering for the data sending.

As ISDN is a synchronous communication medium (it can be assynch when using the LAPB layer within the CAPI library), the transmit buffer of the ISDN Session must always be filled. When the transmit buffer is insufficiently filled, the ISDN layer will stuff random bytes in the transport. When the transmit buffer is overfilled the ISDN layer will drop the data. A session should respond to the dataRequested( ) method call on its ByteStreamListener interface by replying using exactly one call to sendData on the ByteStream Object.

The ByteStream class is a base class that can be extended, the Capi version is just one of the possible implementations. Currently the following implementations exist:
   1) CapiLogicalConnectionProxy
   2) InternalByteStreamThread 3) TracingConnection 4) ReplayConnection Ad 1. CapiLogicalConnectionProxy is the normal implementation in a system using ISDN Ad 2. InternalByteStreamThread, On a system without ISDN some simple testing is possible by internally letting the server communicate within self. The behavior should be identical to the server calling itself.

Ad 3. TracingConnection, For debugging purposes this class will store all the transmitted and received data in a file, while passing on the data to and from another ByteStream. One could compare this with the unix "tee" command that allows for logging data.

Ad 4. ReplayConnection, For debugging purposes this class will read the file created by a racingConnection and mimic the behavior of the stored session.

Creating a Session

The previous session assumed that some sort of Session object exists that corresponds to one session implements the ByteStreamListener interface and is registered to a ByteStream using the registerListener( ) method. This task is implemented by the ByteStreamController and the ByteStreamConnectionListener. Each from of StreamingTransport typically implements a SessionController that creates and administrates ByteStreams for each logical connection with another Session (A server side session communicates with a client side Session).

Typically two forms of creating sessions exist:

1) One calls the other party

2) One receives a call from an other party

Ad 1) This function is executed by calling the makeConnection method on a ByteStreamController. The Controller creates the ByteStream, links it to the (physical) connection and notifies a registered ByteStreamConnectionListener of the new connection.

Ad 2) When the ByteStreamController internally receives an event that a new connection is requested (The phone is ringing), it verifies that a ByteStreamConnectionListener has been registered, creates a new ByteStream that is linked to the new (physical) connection and notifies that ByteStreamConnectionListener of the new connection.

An application must implement an object that extends ByteStreamConnectionListener. In the H324 Server this is implemented by SessionController. It proxy SessionControllerProxy is registered in the base ByteStreamController.

Currently two types of ByteStreamController exist:

1) CapiController

2) InternalByteStreamController

Ad1. This is the standard ISDN version of the ByteStreamController. It can create and receive calls. Basic support for LowerLayerBearerCapabilities is included: One can choose from 4 predefined BearerCapabilities (Speech(C), Binary data, HDLC framing(H), Binary data with H324m caps(D)) by appending the telephone number with the corresponding letter. For H324 all telephone numbers must be preceded with a D.

Ad2. For debugging purposes two ByteStreams are created that are linked as one being the server side and the other being the client side. An example of the use of this library can be found in CapiTest.cpp and CapiTest.h.

Session Etc

At first we thought we needed several threads for one connection. Later we discovered that it suffices to have only the following threads:

CAPI

Multiplexer 1 to 3 AVkecorders

Having more separate threads means more overhead. We found that the AVPlayer can run in the same thread as the Multiplexer, because reading data from a file (our current AVPlayer implementation) is not a bottle neck for the other functionality in Multiplexer thread. The logic of the Session class and the accompanied classes is depictured in the file SESSION.GIF (@@ tobedone).

Roughly the classes can be grouped as follows:

Multiplexer (lowest level protocol)

AdaptationLayer (higher level protocol)

Session (highest level protocol for control; H245)

AVRecorder (highest level protocol for incoming audio/video)

AVPlayer (highest level protocol for outgoing audio/video)

Multiplexer

\SessionManager\Multiplexer.h(44):class ReceivingPdu

\SessionManager\Multiplexer.h(112):class Multiplexer: public ByteStreamListenerThread AdaptationLayer For every connection, there is an array of outgoing AdaptationLayerOut objects, and an array of incoming AdaptationLayerIn objects; one for every channel in use (up to a maximum of 6 channels). Both AdaptationLayerIn and AdaptationLayerOut inherit from a generic AdaptationLayer class.

For the outgoing protocol we always define channel 0 as control channel, 2 for audio, and 3 for video. The use of the AdaptationLayerIn objects is up to the terminal side. To keep an overview of the code, we defined some subclasses in the AdaptationLayerIn class: AdaptationLayerIn1Administration, AdaptationLayerIn2Administration, AdaptationLayerIn3Administration. Every AdaptationLayerOut always contains all 3 subclasses, because a channel can change its properties dynamically (in theory, a video channel can become an audio channel during a connection). These Administration classes have attributes that are specific for the Adaptation layer that is in use. Every AdaptationLayer contains a CyclicPacketBuffer. This is a thread-safe cyclic buffer. The thread-safe capabilities are currently not used (all buffer manipulations occur in the same thread). Also, this CyclicPacketBuffer is not used for incoming audio/video channels (the data is forwarded to the AVRecorders directly, without buffering). An object can subscribe itself to a CyclicPacketBuffer by inheriting from CyclicPacketBufferListener and calling initCPBufferListener( ). In that case, the callback function bufferNotEmpty( ) is called when something is written into the CyclicPacketBuffer.

In our MMM application, we only use this on the receiving side:

a Session subscribed itself to the buffer of the incoming control AdaptationLayer (number 0). On the outgoing side, the Multiplexer directly empties the buffer after calling AVPlayer::play( ) that should fill it.

Session

The Session object was made for several purposes:

handle H245 messages;

hang up a call (e.g. in case of an error);

control (create/delete, start/stop) all other objects.

In a late stage in making the software, we made Session a part of the Multiplexer thread. This means some of the control has been moved to the Multiplexer thread. Especially the code for cleaning up (deleting objects etc.) has become a bit messy now. For doing its H245 tasks, a Session object contains administration objects: MsdAdministration, MtAdministration, CeAdministration, LcAdministration, BicAdministration (the latter two are derived from CapabilitiesAdministration). The names of these objects clearly refer to the H245 protocol (MSD, MT, etc.). They are all defined in one source file pair:

SessionAdministrations.h/SessionAdministrations.cpp.
AVRecorder and AVPlayer

From the AVRecorder and AVPlayer classes we derive classes that can handle specific audio and video protocols. We currently have the following AVPlayers:

SimpleAVPlayer: simply reads the bytes from a file
We currently have the following AVRecorders:
DebugAVRecorder: dumps bytes literally into a file
AVRecorderForAVI: dumps bytes into a file in such a way that the file can be used by an AVI player;
NamedPipeAVRecorder: dumps bytes into a named pipe, so a real-time player can show the video/audio on the (demo) screen. In the H245 protocol we need to tell the other side about our player capabilities. This data is stored in the class AVPlayerCapabilities. For our specific players we defined the derived classes: SimpleAVPlayerCapabilities and AmrAndMpeg4AVPlayerCapabilities.

Main

The main MMM program is in the file ArenaMain.cpp. This file also contains some small class definitions to make the source clearer:Incomingsession, OutgoingSession, SessionController.

Those skilled in the art to which the present invention pertains may make modifications resulting in other embodiments employing principles of the present invention without departing from its spirit or characteristics, particularly upon considering the foregoing teachings. Accordingly, the described embodiments are to be considered in all respects only as illustrative, and not restrictive, and the scope of the present invention is, therefore, indicated by the appended claims rather than by the foregoing description. Consequently, while the present invention has been described with reference to particular embodiments, modifications of structure, sequence, materials and the like apparent to those skilled in the art still fall within the scope of the invention.

The invention claimed is:

1. A telecommunication system; comprising:
a circuit switched network connected with a mobile terminal using circuit switched communication capabilities of said mobile terminal, said mobile terminal having, in addition to said circuit switched communication capabilities, packet switched communication capabilities, wherein said mobile terminal is further connectable to the internet via a packet switched network using the mobile terminal's packet switched communication capabilities and wherein said mobile terminal is configured to enable a user to request, via said packet switched network connecting said mobile terminal to the internet and using said mobile terminal's packet switched communication capabilities, streaming video content stored on a streaming video server located within the Internet,
a gateway, connected to said circuit switched network at one side and connected to the internet at another side, said gateway being configured to convert files having an internet compatible streaming video format received from said streaming video server into streaming video bitstreams in a format configured to be transmitted to said mobile terminal via said circuit switched network, and
a registration unit, said registration unit being connectable with said mobile terminal via said packet switched network using said mobile terminal's packet switched communication capabilities and said registration unit being configured to register for said mobile terminal a terminal identifier linked to said mobile terminal's node address at said circuit switched network,
wherein
said telecommunication system is configured to retrieve, at the registration unit, said mobile terminal's node address at said circuit switched network, guided by said terminal identifier of said mobile terminal,
said telecommunication system is further configured to set up a connection through said circuit switched network between said gateway and said mobile terminal based on said mobile terminal's node address at said circuit switched network and using the mobile terminal's circuit switched communication capabilities, and
said telecommunication system is configured to transmit said streaming video content, converted by said gateway, to said mobile terminal via said circuit switched network.

2. The telecommunication system according to claim 1, said mobile terminal and said gateway at said one side, being configured to exchange video bitstreams complying with a protocol for videoconferencing between mobile terminals.

3. The telecommunication system according to claim 2, wherein said videoconferencing related protocol is the ITU H.324M protocol.

4. The telecommunication system according to claim 1, said gateway, for setting up a connection through said circuit switched network between said gateway and said mobile terminal, configured to originate a call to said mobile terminal of which the node address at said circuit switched network was retrieved in said registration unit.

5. The telecommunication system according to claim 1, said mobile terminal, for setting up a connection through said circuit switched network between said gateway and said mobile terminal, configured to originate a call to said gateway and said gateway being configured to investigate whether the calling terminal is the correct one by matching the calling terminal's node address at said circuit switched network with said node address at said circuit switched network which was retrieved in said registration unit.

6. A method comprising:
in a telecommunication system, said telecommunication system comprising:
a circuit switched network connected with a mobile terminal using circuit switched communication capabilities of said mobile terminal, said mobile terminal having, in addition to said circuit switched communication capabilities, packet switched communication capabilities and said mobile terminal being connectable to the Internet via a packet switched network using said mobile terminal's packet switched communication capabilities,
a gateway, connected to said circuit switched network at one side and connected to the internet at another side,
a registration unit, said registration unit being connectable with said mobile terminal via said packet switched network using said mobile terminal's packet switched communication capabilities, converting at said gateway files having an internet compatible streaming video format received from said streaming video server into streaming video bitstreams in a format configured to be transmitted to said mobile terminal via said circuit switched network, registering at said registration unit for said mobile terminal, a terminal identifier linked to said mobile terminal's node address at said circuit switched network, requesting streaming video content stored on a streaming video server within the Internet by means of said mobile terminal via said packet switched network connecting said mobile terminal to the internet and using the mobile terminal's packet switched communication capabilities, retrieving said mobile terminal's node address at said circuit switched network, guided by said terminal identifier of said mobile terminal, setting up a connection through said circuit switched network between said gateway and said mobile terminal based on said mobile terminal's node address at said circuit switched network and using the mobile terminal's circuit switched communication capabilities, and transmitting said streaming video content to said mobile terminal via said circuit switched network.

7. The method according to claim 6, said format configured to transmit streaming video bitstreams to said mobile terminal via said circuit switched network complying with a protocol for videoconferencing between mobile terminals.

8. The method according to claim 7, wherein said videoconferencing related protocol is the ITU H.324M protocol.

9. An apparatus:

connectable with a mobile terminal via a packet switched network using packet switched communication capabilities of said mobile terminal, said mobile terminal having, in addition to said packet switched communication capabilities, circuit switched communication capabilities, wherein said mobile terminal is connectable to the Internet via said packet switched network using the mobile terminal's packet switched communication capabilities and wherein said mobile terminal is, using said mobile terminal's circuit switched communication capabilities, connected to a circuit switched network, wherein said mobile terminal is configured to enable a user to request, via said packet switched network connecting said mobile terminal to the internet and using the mobile terminal's packet switched communication capabilities, streaming video content stored on a streaming video server within the internet, configured to register for said mobile terminal a terminal identifier linked to said mobile terminal's node address at said circuit switched network, configured to be operationally coupled to a gateway, the gateway being connected to said circuit switched network at one side and connected to the Internet at another side, said gateway being configured to convert files having an Internet compatible streaming video format received from said streaming video server into streaming video bitstreams in a format configured to be transmitted to said mobile terminal via said circuit switched network, and configured to provide said mobile terminal's node address at said circuit switched network to said gateway guided by the terminal identifier of said mobile terminal, wherein said gateway is further configured to set up a connection through said circuit switched network between said gateway and said mobile terminal based on said mobile terminal's node address at said circuit switched network and using the mobile terminal's circuit switched communication capabilities and wherein said gateway is further configured to transmit said streaming video content, converted by said gateway, to said mobile terminal via said circuit switched network.

10. An apparatus comprising means for registration, the means for registration being connectable with mobile terminal means via a packet switched network using packet switched communication capabilities of said mobile terminal means, said mobile terminal means having, in addition to said packet switched communication capabilities, circuit switched communication capabilities, wherein said mobile terminal means are connectable to the internet via said packet switched network using the mobile terminal means' packet switched communication capabilities and wherein said mobile terminal means are, using said mobile terminal means' circuit switched communication capabilities, connected to a circuit switched network, wherein said mobile terminal means are configured to enable a user to request, via said packet switched network connecting said mobile terminal means to the internet and using the mobile terminal means' packet switched communication capabilities, streaming video content stored on means for streaming a video within the internet, configured to register for said mobile terminal means a terminal identifier linked to said mobile terminal means' node address at said circuit switched network, configured to be operationally coupled to gateway means, the gateway means being connected to said circuit switched network at one side and connected to the internet at the other side, said gateway means being configured to convert files having an internet compatible streaming video format received from said means for streaming a video into streaming video bitstreams in a format configured to be transmitted to said mobile terminal means via said circuit switched network, and configured to provide said mobile terminal means' node address at said circuit switched network to said gateway means guided by said terminal identifier of said mobile terminal means, wherein said gateway means are further configured to set up a connection through said circuit switched network between said gateway means and said mobile terminal means based on said mobile terminal means' node address at said circuit switched network and using the mobile terminal mean's circuit switched communication capabilities and wherein said gateway means are further configured to transmit said streaming video content, converted by said gateway means, to said mobile terminal means via said circuit switched network.

* * * * *